United States Patent Office
3,207,576
Patented Sept. 21, 1965

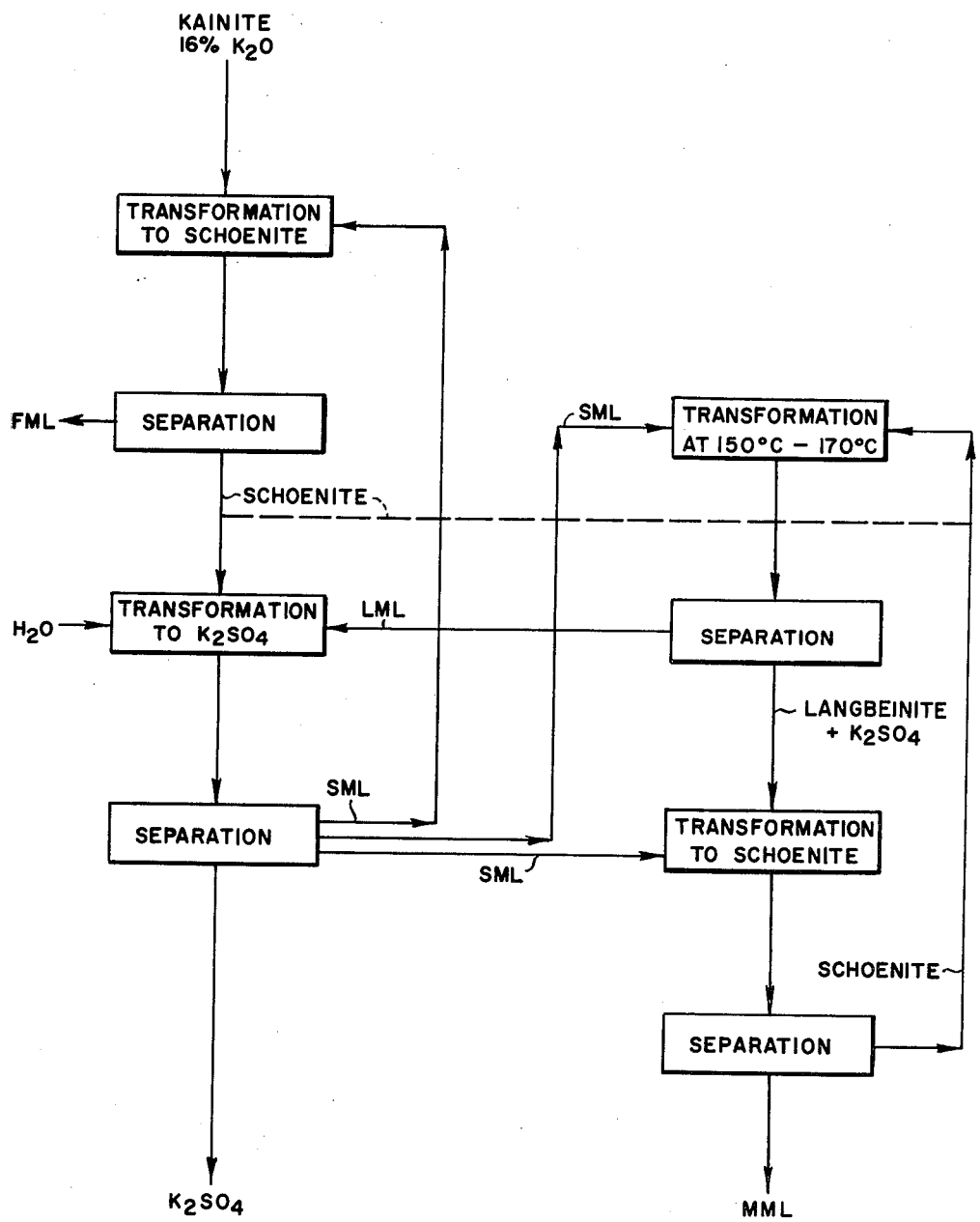

3,207,576
PROCESS FOR PRODUCING POTASSIUM SULFATE FROM KAINITE THROUGH THE INTERMEDIATE FORMATION OF SCHOENITE AND LANGBEINITE
Gerlando Marullo, Dante Cadorin, Michele Maggiore, and Giacinto Veronica, Novara, Italy, assignors to Montecatini Società Generale per l'Industria Mineraria e Chimica, a corporation of Italy
Filed Dec. 8, 1961, Ser. No. 157,931
Claims priority, application Italy, Dec. 12, 1960, 21,290/60
4 Claims. (Cl. 23—121)

Our invention relates to, and has as an object thereof, a process for producing potassium sulfate from kainite, with high yields of $K_2O$ and a magnesium sulfate solution containing potassium sulfate as impurity.

According to a known process, kainite $$(MgSO_4 \cdot KCl \cdot 3H_2O)$$

is converted to schoenite ($K_2SO_4 \cdot MgSO_4 \cdot 6H_2O$) which is leached with water to produce potassium sulfate ($K_2SO_4$). For instance, Italian Patent 502,679 discloses a process of converting kainite, either natural or enriched, into potassium sulfate having a low NaCl content. In this process schoenite, which is an intermediate product, is leached with water and converted to $K_2SO_4$. The best yields for this leaching operation are obtained at 48° C. when 0.9 part of water is used for 1 part of schoenite. The sulfuric acid mother liquors, also called sulfate mother liquors (SML) produced by said leaching, contain $MgSO_4$ and $K_2SO_4$ in a molar ratio of about 2:1. The SML is cooled down to room temperature to permit the schoenite to settle down and thereafter employed for converting more kainite into schoenite, thereafter repeating the process.

In the above process the sulfate mother liquors (SML) obtained are in excess of the quantity needed for the conversion of kainite to schoenite. For this reason, when kainite is converted into $K_2SO_4$ only, yields of $K_2O$ in the order of 70% are obtained. In order to obtain yields of 80%, it is necessary to produce not only $K_2SO_4$, but also schoenite. In this case, the useful product $K_2SO_4$ contains about 55% of the entering $K_2O$. The schoenite contains about 45% of the remaining $K_2O$. We have found that the $K_2SO_4$ yield from kainite treatment can be appreciably increased when the sulfate mother liquors (SML) are used to treat schoenite at higher temperature and pressure. Under the above conditions, the schoenite is converted into langbeinite ($K_2SO_4 \cdot 2MgSO_4$) and accompanied by varying amounts of potassium sulfate and langbeinitic mother liquor (LML). The LML, being impoverished of $MgSO_4$, which went into the formation of langbeinite, is able to convert additional quantities of schoenite into potassium sulfate at the above-mentioned optimum temperature of 48° C. The langbeinite, in turn, is treated with sulfate mother liquors (SML) to be converted into schoenite and magnesium sulfate mother liquors (MML) containing a high quantity of magnesium sulfate.

The process of our invention is schematically shown in the drawing. Kainite is treated with sulfate mother liquor (SML) to yield schoenite and FML, final mother liquor. The schoenite and the FML are separated, with the FML leaving the cycle as a waste product. The schoenite is then treated with water and langbeinitic mother liquors (LML), to yield potassium sulfate and sulfate mother liquors (SML). A portion of the sulfate mother liquors (SML) is employed in the above transformation of kainite to schoenite. Another portion of the sulfate mother liquors (SML) is reacted with schoenite, which is preferentially recycled from a subsequent step, at temperatures between 150–170° C. and pressure between 5 and 7 absolute atmospheres, to give langbeinite and the langbeinitic mother liquors (LML). The langbeinitic mother liquors, as stated above, are used for the conversion of schoenite to potassium sulfate. The langbeinite and potassium sulfate separated from the langbeinitic mother liquors (LML) are converted by another portion of the sulfate mother liquors (SML) at temperatures below 67° C. and preferably between 55 and 65° C. into schoenite which is recycled after separation from the magnesium mother liquors (MML) produced.

This cyclical operation converts the excess sulfate mother liquors (SML) to langbeinitic mother liquors (LML) and to magnesium mother liquors (MML), thereby removing a large portion of the magnesium sulfate, which prevents the formation of potassium sulfate, from the sulfate mother liquors (SML). We can obtain yields of $K_2O$ greater than 80% while producing $K_2SO_4$ only from kainite. We ascribe this to the effect that the excess sulfate mother liquors (SML), with respect to the quantity needed for converting kainite into schoenite, is utilized in the companion operation of transforming schoenite at high temperatures to langbeinite and the subsequent transformation of langbeinite, at lower temperature, to schoenite which is recycled.

Our invention has as a further object the reduction of the total amount of water required for the overall process, since we employ the langbeinite mother liquors (LML), rich in $K_2SO_4$ in the schoenite leaching to $K_2SO_4$. Still another object of our process is to obtain in the conversion of langbeinite to schoenite, magnesium mother liquors (MML) rich in magnesium sulfate and free from chlorides. Said magnesium mother liquors (MML) contain $K_2SO_4$ in a molar ratio of $MgSO_4:K_2SO_4::9:1$, and may be utilized for the preparation of magnesium sulfate or conversion to sodium sulfate.

Another advantage our process has over conventional processes is that at least one third of the SML originating from the schoenite leaching to potassium sulfate is employed hot in the collateral cycle. Only a portion of the sulfate mother liquor (SML) is cooled to room temperature in order to separate schoenite and the subsequent kainite conversion. Our process permits, and has as further object thereof, not only the production of potassium sulfate and magnesium mother liquors but also the production of intermediate products, i.e. schoenite, langbeinite and mixtures thereof. In this modification, the equilibrium between the principal cycle (kainite conversion to potassium sulfate) and the collateral cycle (schoenite recycle through langbeinite) is changed by varying the ratios of the utilization of the various SML fractions or diverting the common intermediate, schoenite, from one cycle to another. This diverting has been indicated on the drawing by a dotted line. It should be noted that the drawing does not show either heating or cooling for the various solutions present, nor the heat nor salt recoveries carried out during the various operational steps.

The following example illustrates, but is not intended to limit, the scope of our invention.

*Example*

1000 g. of kainite containing 17% $K_2O$ are treated with 950 ml. of sulfate mother liquors (SML) containing therein 44 g./l. of Mg and 88.5 g./l. of $K_2O$, at a temperature of 45° C. This yields 1060 g. of schoenite containing 21.8% $K_2O$ and 900 ml. of final mother liquors (FML) which leave the cycle. The schoenite in turn is leached at 48° C. with 750 g. of water and 420 g. of langbeinitic motor liquor (LML) containing therein 16.4% $K_2SO_4$ and 4.1% $MgSO_4$. This leaching step produces 270 g. of $K_2SO_4$ containing 51% $K_2O$ and 1490 ml. of SML. 63% of the SML produced is recycled to the kainite transformation step. 20% of the SML is heated in an autoclave with 253 g. of schoenite at 158° C. and a pressure of 5.5 absolute atmospheres to yield the above-mentioned 420 g. of LML and 212 g. of langbeinite. The langbeinite is treated with the remaining 17% of SML at 60° C. to yield 253 g. of schoenite which is recycled and 292 g. of magnesium mother liquor (MML) containing therein 7.5% of $K_2SO_4$ and 35.8% of $MgSO_4$. This results in an overall yield of 81% based on $K_2O$.

We claim:

1. A process for converting kainite to potassium sulfate and magnesium sulfate comprising the following steps:
    (a) converting kainite to schoenite by the use of sulfate mother liquors produced by step (b);
    (b) treating the schoenite produced in step (a) with langbeinite mother liquors and water at 48° C., to yield potassium sulfate and sulfate mother liquors;
    (c) treating schoenite at a temperature from about 150° to about 170° C. and a pressure of from 5 to 7 absolute atmospheres with sulfate mother liquor obtained from step (b), to yield langbeinite and langbeinitic mother liquor, and recycling said langbeinitic mother liquor to step (b);
    (d) treating the langbeinite produced in step (c) with sulfate mother liquor obtained in step (b), at a temperature below 67° C., to yield schoenite which is recycled to step (c) and magnesium mother liquor.

2. A process for converting kainite to potassium sulfate and magnesium sulfate comprising the following steps:
    (a) converting kainite to schoenite by the use of sulfate mother liquors produced by step (b);
    (b) treating the schoenite produced in step (a) with langbeinite mother liquors and water, to yield potassium sulfate and sulfate mother liquors;
    (c) treating schoenite at a temperature between 150 and 170° C. and a pressure of from 5 to 7 atmospheres absolute with sulfate mother liquor obtained from step (b), to yield langbeinite and langbeinitic mother liquor, and recycling said langbeinitic mother liquor to step (b);
    (d) treating the langbeinite produced in step (c) with sulfate mother liquor obtained in step (b), at a temperature below 67° C., to yield schoenite which is recycled to step (c) and magnesium mother liquor.

3. A process for converting kainite to potassium sulfate and magnesium sulfate comprising the following steps:
    (a) converting kainite to schoenite by the use of sulfate mother liquors produced by step (b);
    (b) treating the schoenite produced in step (a) with langbeinite mother liquors and water, to yield potassium sulfate and sulfate mother liquors;
    (c) treating schoenite at a temperature from about 150° to about 170° C. and a pressure of from 5 to 7 absolute atmospheres with sulfate mother liquor obtained from step (b), to yield langbeinite and langbeinitic mother liquor, and recycling said langbeinitic mother liquor to step (b);
    (d) treating the langbeinite produced in step (c) with sulfate mother liquor obtained in step (b), at a temperature between 55 and 65° C., to yield schoenite, which is recycled to step (c) and magnesium mother liquor.

4. A process for converting kainite to potassium sulfate and magnesium sulfate comprising the following steps:
    (a) converting kainite to schoenite by the use of sulfate mother liquors produced by step (b);
    (b) treating the schoenite produced in step (a) with langbeinite mother liquors and water at 48° C., to yield potassium sulfate and sulfate mother liquors;
    (c) treating schoenite at a temperature between 150 and 170° C. and a pressure of 5 to 7 atmospheres absolute with sulfate mother liquor obtained from step (b), to yield langbeinite and langbeinitic mother liquor, and recycling said langbeinitic mother liquor to step (b);
    (d) treating the langbeinite produced in step (c) with sulfate mother liquor obtained in step (b), at a temperature between 55 and 65° C., to yield schoenite which is recycled to step (c) and magnesium mother liquor.

References Cited by the Examiner

UNITED STATES PATENTS 3,003,849   10/61   Veronica _____ 23—121 X

OTHER REFERENCES

Mellor: A Comprehensive Treatise on Inorganic and Theoretical Chemistry, Longmans, Green & Co., New York, N.Y., vol. 4, 1923, pages 335–340.

MAURICE A. BRINDISI, *Primary Examiner.*